United States Patent
Huynh et al.

(10) Patent No.: US 12,189,979 B1
(45) Date of Patent: Jan. 7, 2025

(54) SYSTEM AND METHOD FOR SYSTEMATIC GENERATION OF TEST CASES USED TO VALIDATE MEMORY COHERENCE OF A MULTIPROCESSOR SYSTEM

(71) Applicant: Marvell Asia Pte Ltd, Singapore (SG)

(72) Inventors: Duy Quoc Huynh, Cedar Park, TX (US); Dante Fabrizio, Broomall, PA (US)

(73) Assignee: Marvell Asia Pte Ltd, Singapore (SG)

( * ) Notice: Subject to any disclaimer, the term of this patent is extended or adjusted under 35 U.S.C. 154(b) by 210 days.

(21) Appl. No.: 17/973,902

(22) Filed: Oct. 26, 2022

Related U.S. Application Data

(60) Provisional application No. 63/272,144, filed on Oct. 26, 2021.

(51) Int. Cl.
| | | |
|---|---|---|
| *G06F 11/00* | (2006.01) | |
| *G06F 3/06* | (2006.01) | |
| *G06F 11/36* | (2006.01) | |

(52) U.S. Cl.
CPC .......... *G06F 3/0655* (2013.01); *G06F 3/0604* (2013.01); *G06F 3/0673* (2013.01); *G06F 11/3672* (2013.01)

(58) Field of Classification Search
CPC .. G06F 11/3672; G06F 3/0655; G06F 3/0604; G06F 3/0673
See application file for complete search history.

(56) References Cited

U.S. PATENT DOCUMENTS

| | | | | |
|---|---|---|---|---|
| 5,748,879 A * | 5/1998 | Kobayashi | ............. | G11C 29/08 |
| | | | | 714/719 |
| 5,794,012 A * | 8/1998 | Averill | .................. | G06F 11/261 |
| | | | | 703/22 |
| 5,799,195 A * | 8/1998 | Ross | ..................... | G06F 15/167 |
| | | | | 710/200 |
| 6,021,126 A * | 2/2000 | White | ................... | H04M 7/128 |
| | | | | 379/90.01 |
| 7,529,890 B1 * | 5/2009 | Neuman | ............. | G06F 11/2236 |
| | | | | 711/141 |
| 8,688,910 B2 * | 4/2014 | Moyer | ................ | G06F 12/0831 |
| | | | | 717/124 |
| 9,123,444 B2 * | 9/2015 | Subramaniam | ..... | G06F 11/2635 |
| 9,812,221 B1 * | 11/2017 | Hagen | ................ | G06F 12/1027 |
| 11,455,222 B2 * | 9/2022 | Liu | ........................ | G06F 11/267 |
| 2004/0093536 A1 * | 5/2004 | Weller | ................... | G06F 11/263 |
| | | | | 714/33 |

(Continued)

*Primary Examiner* — Amine Riad

(57) ABSTRACT

A new approach is proposed to support systematic generation of a set of test cases/stimuli used to validate a multiprocessor system having a plurality of processors that supports memory coherence. A pair of two of the plurality of processors is first selected for testing one pair at a time, wherein a first of the pair is a requester requesting access to a cache associated with a second of the pair, which is a snooped requester. The test cases are automatically generated based on an algorithm-driven script, wherein the set of test cases includes an instruction set and all valid combinations of cache states of the processors. The instruction set is then executed by the pair of processors to validate memory coherence of the pair of processors. The above process is repeated so that each processor of the plurality of processors is included for memory coherence testing at least once.

21 Claims, 7 Drawing Sheets

(56) References Cited

U.S. PATENT DOCUMENTS

| | | | |
|---|---|---|---|
| 2015/0286573 A1* | 10/2015 | Socarras | G06F 12/0875 |
| | | | 711/123 |
| 2017/0220440 A1* | 8/2017 | Dusanapudi | G06F 11/2242 |
| 2018/0136998 A1* | 5/2018 | Habermann | G06F 11/0724 |
| 2019/0042341 A1* | 2/2019 | Walton | G06F 12/084 |

* cited by examiner

SYSTEM AND METHOD FOR SYSTEMATIC GENERATION OF TEST CASES USED TO VALIDATE MEMORY COHERENCE OF A MULTIPROCESSOR SYSTEM

CROSS-REFERENCE TO RELATED APPLICATIONS

This application claims the benefit of United States Provisional Patent Application No. 63/272,144, filed Oct. 26, 2021, which is incorporated herein in its entirety by reference.

BACKGROUND

A typical multiprocessor system has a plurality of processors/nodes/masters and supports multiple levels of cache (e.g., L2 and L3 cache) to increase memory access performance. Memory or cache coherence is needed to keep cached copies of a memory location consistent across the different levels of cache. In some cases, memory coherence can be implemented and maintained using hardware, which for non-limiting examples, can be ARM's interconnects/fabrics such as CCN-502, CCI-400. When a System on Chip (SoC) is developed for the multiprocessor system, design verification (DV) has the responsibility to validate that the various modules of the multiprocessor system are properly integrated on the SoC. If a fabric that supports memory coherence is present, all of the relevant interface signals belonging to the modules connected to the fabric (e.g., requester nodes/processors, snoop nodes/processors, etc.) need to be tested and verified. Failing to do so would result in poor simulation coverage given the complexity of the coherent interfaces, which, in the non-limiting example of ARM's CHI protocol, may include request, snoop, response, and data channels. Another grave consequence is the possibility of non-functional feature. For a non-limiting example, if the optional upper address bits of the CCI-400 are not enabled (mistakenly tied to 0s), the Distributed Virtual Memory (DVM) function will fail. As instructions set supporting cache coherence becomes more complex, the risk of failing to catch integration mistakes further increases.

Testing of the multiprocessor system is currently achieved with direct test cases (e.g., hard coding)—typically with one processor (e.g., a snooped requester) starting from an invalid cache state of its cache and modifying a cache line in its cache which is subsequently read by other processors (e.g., requesters). All cache states start from an invalid state at cold start. Depending on which subsequent coherent instructions/transactions are executed, the L2 cache states will be updated with the appropriate values by hardware accordingly. However, in hardware simulation—for testing purpose—it is desirable to be able to execute a coherent transaction "on demand", i.e. skipping all of the steps beginning with the invalid states. Since a coherent instruction can only be executed if the cache states of both the requester and the snooped requester are valid (assuming only a pair of processors are involved), one way to satisfy this demand is to force the L2 cache states of the involved nodes. The problem with this approach is that the L3 cache residing in the fabrics which implements a "bus snooping" scheme would be out of sync with the L2 cache states since they may be proprietary and cannot be forced or manipulated. Given a module of the multiprocessor system that implements a specific protocol (such as Ethernet, PCIe, eMMC), a suite of test cases which generates traffic for that protocol, e.g., wake-on-LAN, 802.1Q VLAN-tagged frame, jumbo packet for the Ethernet, can be selected and used. However, no such dedicated suite of test cases typically exists for a processor connected to a fabric-except for the basic transactions which implement the corresponding protocol (e.g., ARM's AXI4, ACE, CHI). In the case of processors which support coherent instructions, generating corresponding test cases is even more challenging. The reason is that rather simple cache state transitions (e.g., MESI, MOESI) of earlier processors that support memory coherence have been expanded into more complex sets (e.g., I, UC, SC, UCE, UD, SD for ARM's CHI protocol). In addition, the cache state setup required for each participating processor/node is elaborate because the cache states of the requester and all participating snooped requesters are tied to the corresponding coherent transactions. The possible combinations of the transactions to the said above cache states can grow exponentially, and not all combinations of cache states are valid. The current testing method done with direct test cases is neither practical nor comprehensive since neither a full coherent instruction set of the processors nor all possible combination of initial cache states of the requesters and snooped requesters are fully covered by the direct test cases.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 2 depicts examples of cache state transition tables for the requester and the snooped requester, respectively, according to an aspect of a present embodiment.

FIG. 3 depicts examples of valid combination cache state pairs under ARM's CHI protocol according to an aspect of a present embodiment.

DETAILED DESCRIPTION

Figure 1:
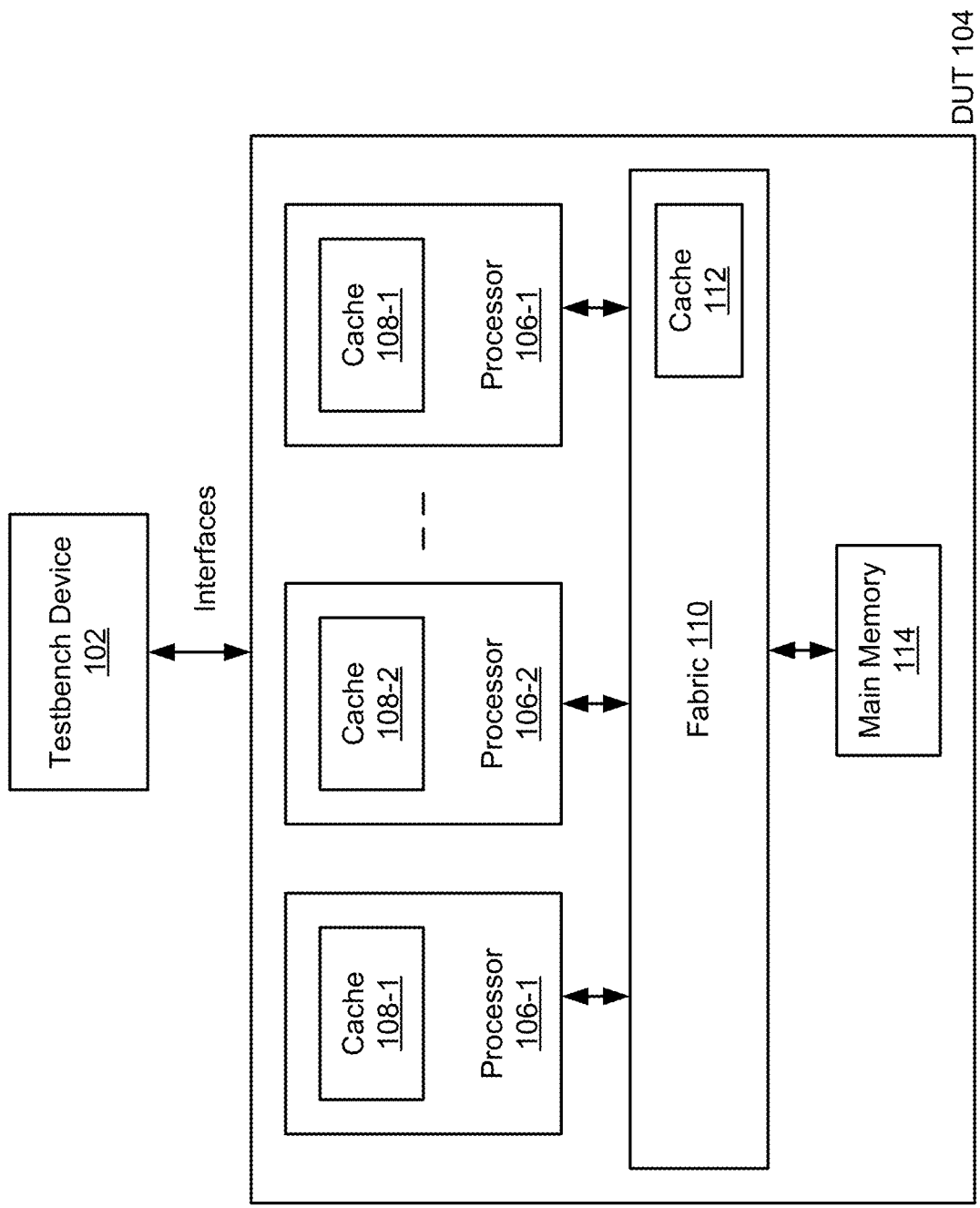
FIG. 1 depicts an example of a diagram of a system to support systematic test case generation to validate a multiprocessor system that supports memory coherence according to an aspect of a present embodiment.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

A new approach is proposed to support systematic generation of a set of test cases/stimuli used to validate a multiprocessor system having a plurality of processors/nodes that supports memory coherence. A pair of two processors of the plurality of processors are first selected for testing one pair at a time, wherein a first processor of the pair of processors is a requester requesting access to a cache associated with a second processor of the pair of processors (a snooped requester). A set of test cases/stimuli are then automatically generated based on an algorithm-driven script, wherein the set of test cases includes an instruction set of a list of instructions to be executed by one or both of the pair of processors and a set of valid combinations of states of caches associated with the requester and the snooped requester. The automatically-generated instruction set is then executed by one or both of the pair of processors to validate memory coherence of the pair of processors. The above process is repeated so that each processor of the plurality of processors is included for memory coherence testing at least once until the memory coherence of the multiprocessor system is confirmed.

The proposed approach adopts the algorithm-driven script to systematically (instead of ad hoc) generate a comprehensive set of cache coherent instructions of an SoC to validate its integration. In addition, the algorithm-driven script is flexible and can be parameterized to support various kinds of memory coherence protocols. By testing the plurality of processors in the multiprocessor system one pair of processors at a time, the proposed approach achieves leveraged scalability for the testing of the multiprocessor system wherein the testing complexity does not increase with the number of processors/nodes in the multiprocessor system. As a result, the proposed approach can support cache coherence testing of any number of processors in the multiprocessor system and there is no need to rewrite the test cases to target a particular configuration of the multiprocessor system.

FIG. 1 depicts an example of a diagram of a system 100 to support systematic test case generation to validate a multiprocessor system that supports memory coherence. Although the diagrams depict components as functionally separate, such depiction is merely for illustrative purposes. It will be apparent that the components portrayed in this figure can be arbitrarily combined or divided into separate software, firmware, and/or hardware components. Furthermore, it will also be apparent that such components, regardless of how they are combined or divided, can execute on the same host or multiple hosts, and wherein the multiple hosts can be connected by one or more networks.

In the example of FIG. 1, the system 100 includes at least a testbench device 102 configured to create a testing and verification environment for a device under test (DUT) 104. Here, the testbench device 102 includes on one or more computing units or devices (not shown) each having one or more processing and storage units with software stored in the storage units and executed by the processing units. The testbench device 102 interacts with the DUT 104 via one or more interfaces and optionally over one or more communication networks. For a non-limiting example, the DUT 104 can be a multiprocessor system having a plurality of processors 106s, a fabric 110 connecting caches 108s of the plurality of processors 106s with a main memory 114 of the DUT 104. In some embodiments, the DUT 104 has multiple levels of caches for storing data retrieved from the main memory 114. In some embodiments, each of the plurality of processors 106s has its own associated cache 108, e.g., an L2 cache, for maintaining data retrieved from the main memory 114 for quick access by the each of the plurality of processors 106s. In some embodiments, the fabric 110 is configured to support communication among the caches 108s of the plurality of processors 106s and the main memory 114. In some embodiments, the fabric 110 has its own cache 110, e.g., an L3 cache, for maintaining data being transferred among the processors 106s and/or the main memory 114.

In the example of FIG. 1, the testbench device 102 is configured to select only a pair of the plurality of processors 106s, e.g, (processor 106-1, processor 106-2), for memory coherence testing one pair at a time. In some embodiments, one of the pair of processors, e.g., processor 106-1, is a requester, which is requesting access to data stored a cache line in the cache 108-2 associated with the other of the pair of processors, e.g., processor 106-2, which is a snooped requester. If there are more than two processors 106s in the DUT 104, the testbench device 102 is configured to continue/repeat the same memory coherence testing process by selecting another overlapping pair of processors 106s sharing at least one processor with the current pair, e.g., (processor 106-2, processor 106-n), until every processor of the plurality of processors 106 has been covered at least once by the memory coherence testing process. By limiting the memory coherence testing to one pair of the processors 106 at a time, the testbench device 102 reduces the complexity in generating different cache states combinations between the requesters and snooped requesters, yet providing full coverage of all of the plurality of processors 106s with no drawbacks.

Figure 2:
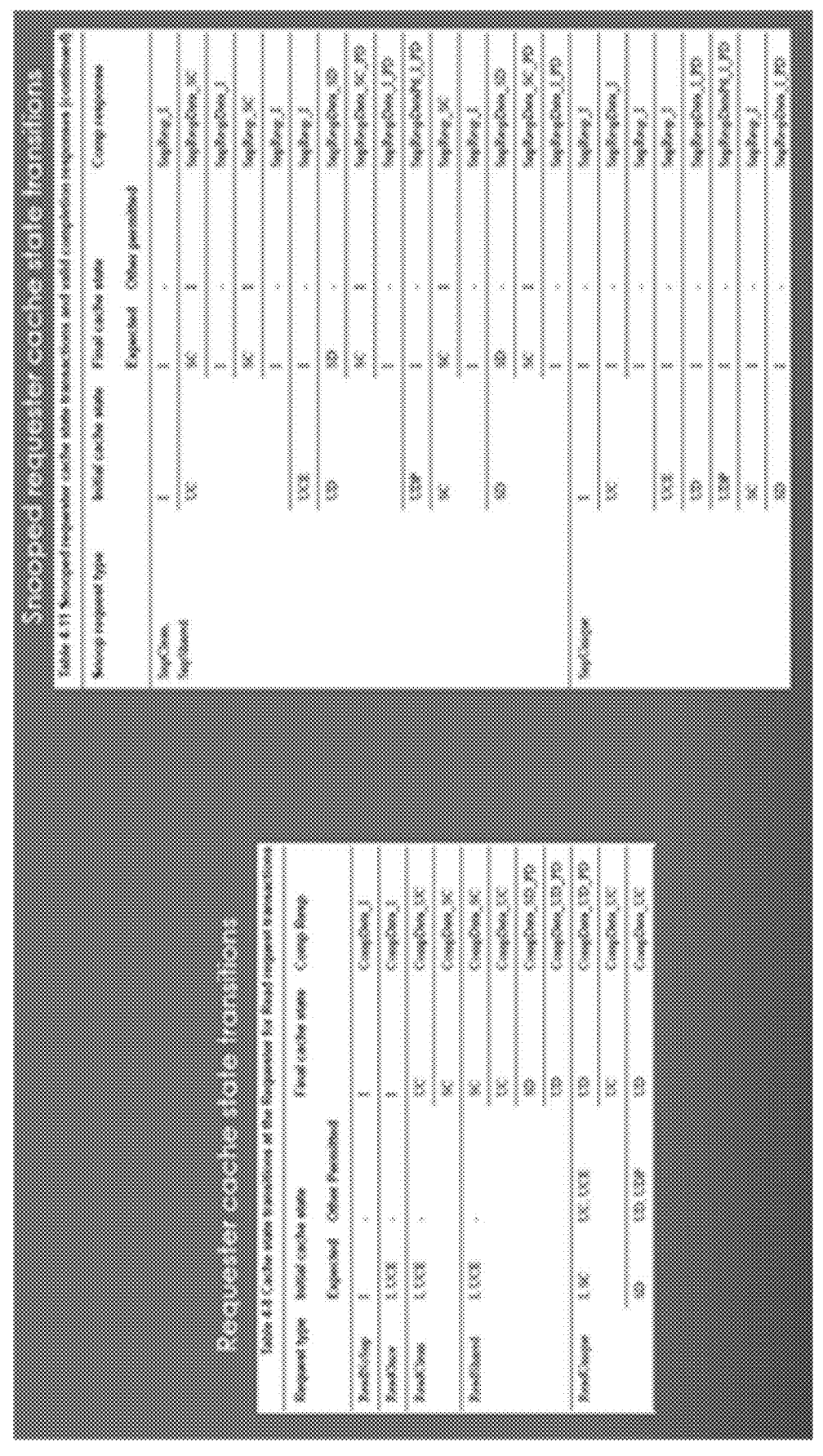

In some existing implementations, direct (i.e. hard coded) test cases are used in which the code references the cache state transitions diagrams of the caches 108s. Those diagrams are simple for early generation of processors supporting cache coherency. Such diagrams, however, may not exist for processors with expanded cache states in which the requester and/or the snooped requester can assume multiple initial cache states for a given instruction. In some embodiments, the cache state transition diagrams are instead replaced with cache state transition tables, which typically show request types and/or possible corresponding initial and final cache states in order to capture all of the possible combinations. FIG. 2 depicts examples of cache state transition tables for the requester and the snooped requester, respectively. With the current embodiments, the testbench device 102 adopts a code-driven algorithm to derive a set of valid cache states of the caches of the requester and the snooped requester, respectively, for a given instruction in order to support systematic generation of the test cases/stimuli and to achieve comprehensive coverage for cache coherence testing. After the pair of processors 106s for memory coherence testing has been selected, the testbench device 102 is configured to automatically generate a set of test cases from an algorithm-driven script, wherein the set of test cases covers an instruction set to be executed by one or both processors of the pair of processors and a set of valid combinations of cache states of the caches 108s associated the pair of processors 106s as a requester and snooped requester pair supporting cache coherence, e.g., (processor 106-1, processor 106-2). Here, the instruction set can be either a partial or a full instruction set and the set of valid combinations of cache states may include some or all of the valid combinations.

Figure 3:
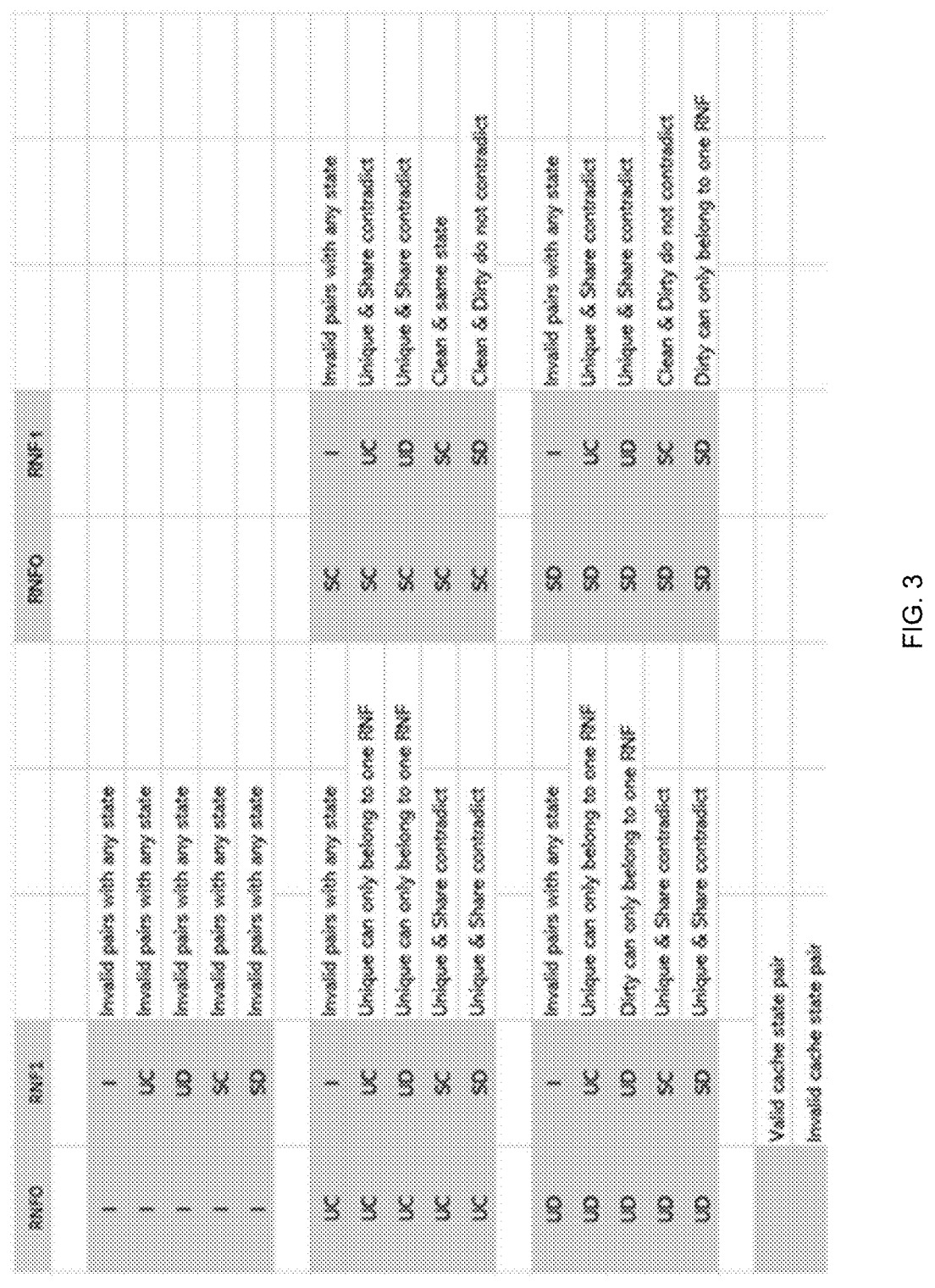
Figure 4:
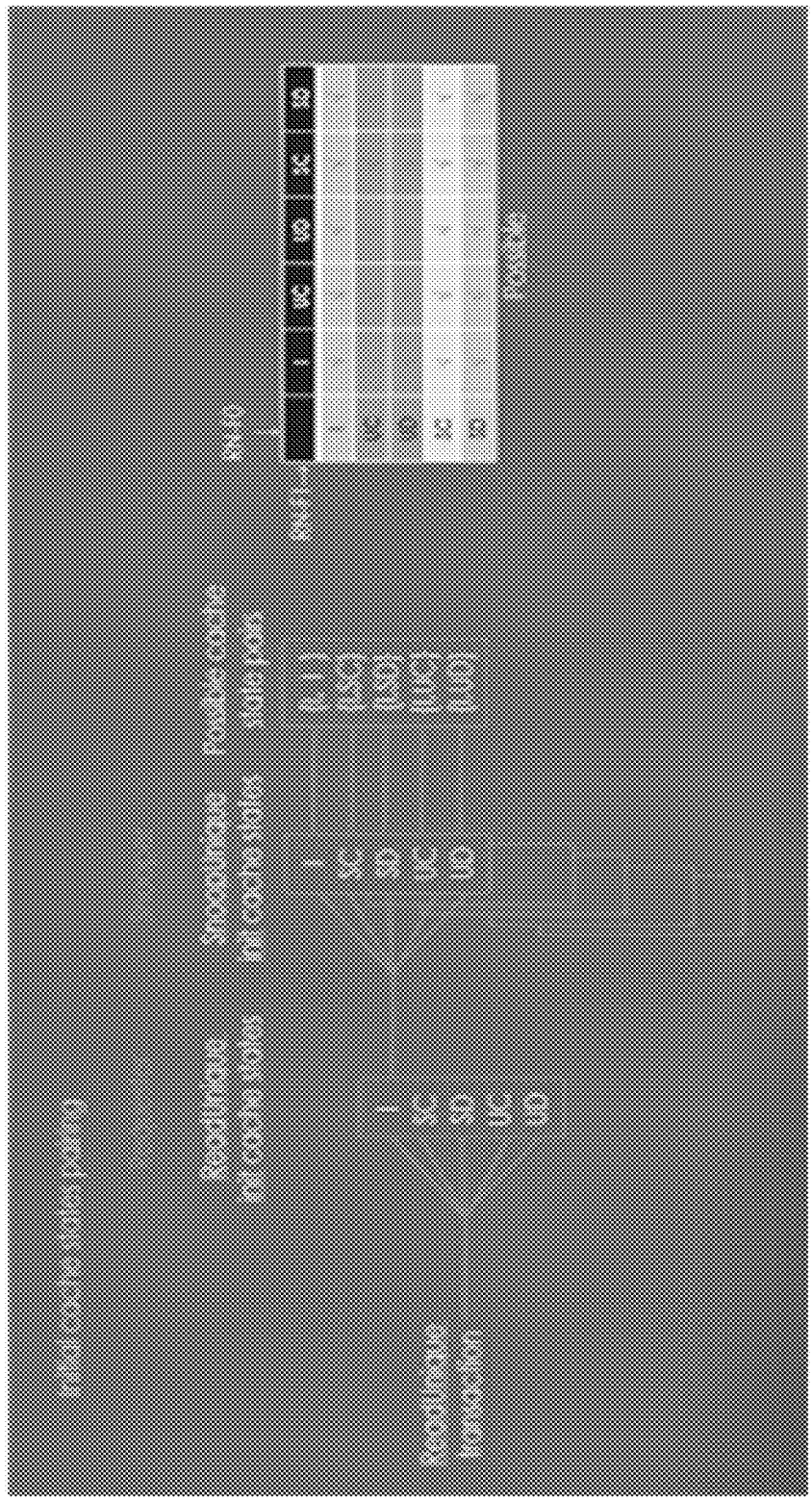
FIG. 4 depicts examples of possible cache state pairs for a transaction called ReadUnique according to an aspect of a present embodiment.
Figure 5:
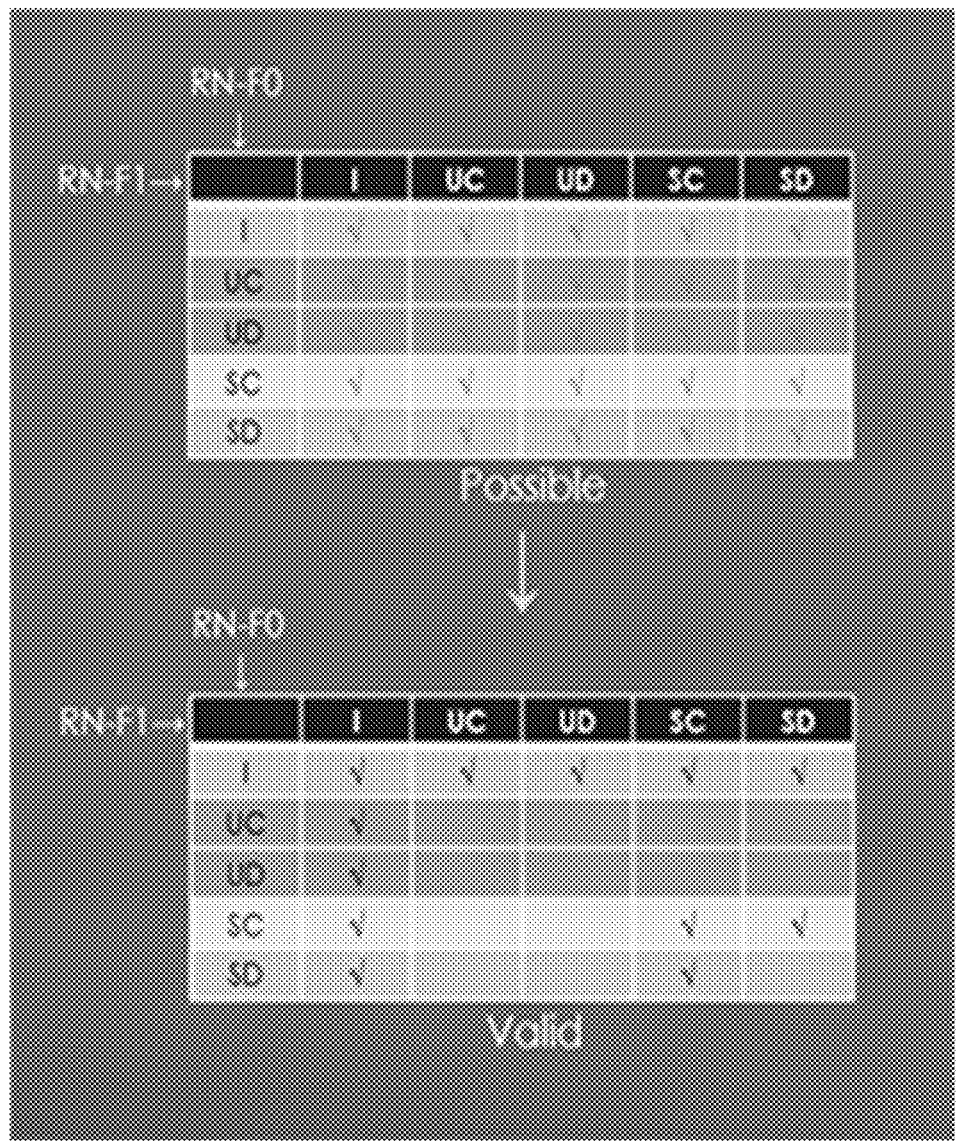
FIG. 5 depicts examples of valid cache state pairs for the transaction ReadUnique according to an aspect of a present embodiment.
Figure 6:
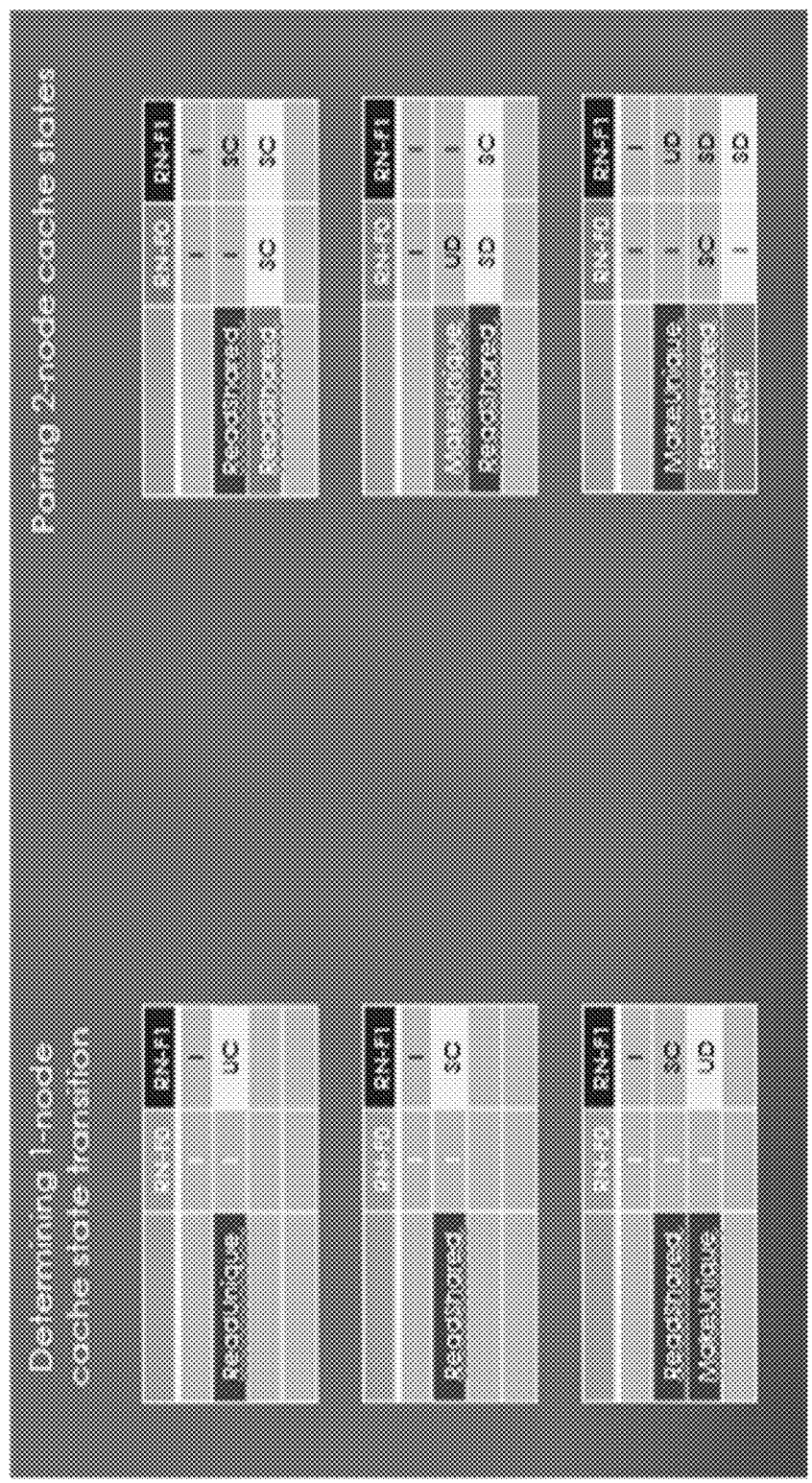
FIG. 6 depicts examples 1-node and 2-node cache state transitions, respectively, according to an aspect of a present embodiment.

In some embodiments, the testbench device 102 is configured to automatically derive the set of test cases in two stages-preparation and script-driven stimulus generation. During the preparation phase, the testbench device 102 is configured to first assemble a list of instructions or transactions of the instruction set, e.g., transaction_set, which pertains to and to be executed by one of the pair of processors 106s. For each instruction of the list of instructions, the testbench device 102 assembles a list of initial cache states permissible for a request by the requester, using the corresponding table that lists the cache state transitions at the requester for reference. The testbench device 102 then repeats the above step for the snooped requester, using the table which lists the cache state transitions at the snooped requester. Once the lists of permissible initial cache states have been created for both the requester and the snooped requester, the testbench device 102 then derives a plurality of valid cache state pairs for a given instruction (assuming a 2-node/processor configuration) as follows. First, the testbench device 102 determines which combinations of cache states are valid among all possible cache state pair combinations given a specific protocol (for example ARM's CHI), wherein these valid combinations become "constraints" for the test case generation. FIG. 3 depicts examples of valid combination cache state pairs under ARM's CHI protocol. The testbench device 102 then derives all possible cache state pairs from the initial permissible cache states of the requester and the snooped requester pair for the given instruction/transaction. FIG. 4 depicts examples of possible cache state pairs for a transaction called ReadUnique. The testbench device 102 then applies the valid combinations as constraints to retain only the valid cache state pairs given the possible cache states from the previous step. FIG. 5 depicts examples of valid cache state pairs for the transaction ReadUnique. The testbench device 102 finally categorizes the cache state transitions into 1-node cache state transitions, where instruction(s) cause one processor to transition/move from an invalid cache state to one of the other cache states if both of the processors 106s in the pair starting from an invalid cache state, e.g., (I, I)→(I, UC), or 2-node cache state transitions, where combination of instructions from both processors 106s is needed to have them transition to a desired cache state pair (X, Y) if both nodes starting from an invalid cache state, e.g., (I, I). FIG. 6 depicts examples 1-node and 2-node cache state transitions, respectively. By transitioning, for example, the L2 cache states, to the desired ones for a given coherent instruction, the testbench device 102 is configured to maintain the integrity of the L3 cache.

During the script-driven stimulus generation phase, the testbench device 102 is configured to automatically generate the set of test cases covering the set of instructions according to one or more algorithm-driven scripts. In some embodiments, the testbench device 102 is configured to generate a test case/stimulus by randomizing a set of parameters including but not limited to the instruction, the initial cache state of the caches of requester and the initial cache state of the snooped requester. In some embodiments, the testbench device 102 is configured to generate a test case/stimulus directly by targeting and preselecting a valid parameter of one of the instructions, the initial cache state of the requester and the valid initial cache state of the snooped requester. In some embodiments, the testbench device 102 is configured to generate a comprehensive set of test cases/stimuli that includes all possible combinations of instructions and cache states that would be executed for memory coherence testing of the pair of processors 106s.

Note that, in some embodiments, different algorithms and corresponding scripts may be adopted for generating the test cases depending on the specific test case generation approaches discussed above. For the non-limiting example of random generation of the test cases, the testbench device 102 is configured to select one valid cache states pair corresponding to an instruction/transaction before the transaction can be issued through the iterative process described below. First, a transaction/request is randomly selected from the transaction_set. A cache state is then selected for the requester from a list of initial cache states permissible for that requester and a cache state is also selected for the snooped requester from a list of initial cache states permissible for that snooped requester. The testbench device 102 then verifies if the pair of cache states of the requester and the snooped requester is a valid combination. If the combination of the pair of cache states is invalid, another instruction/transaction is selected and the steps above are repeated. If the combination of the pair of cache states is valid, the cache states of the configured node pair are moved from the initial invalid states (I, I) to the desired cache state combination obtained from the previous step using the appropriate instructions categorized above. Finally, the transaction is issued/executed from the requester processor.

Figure 7:
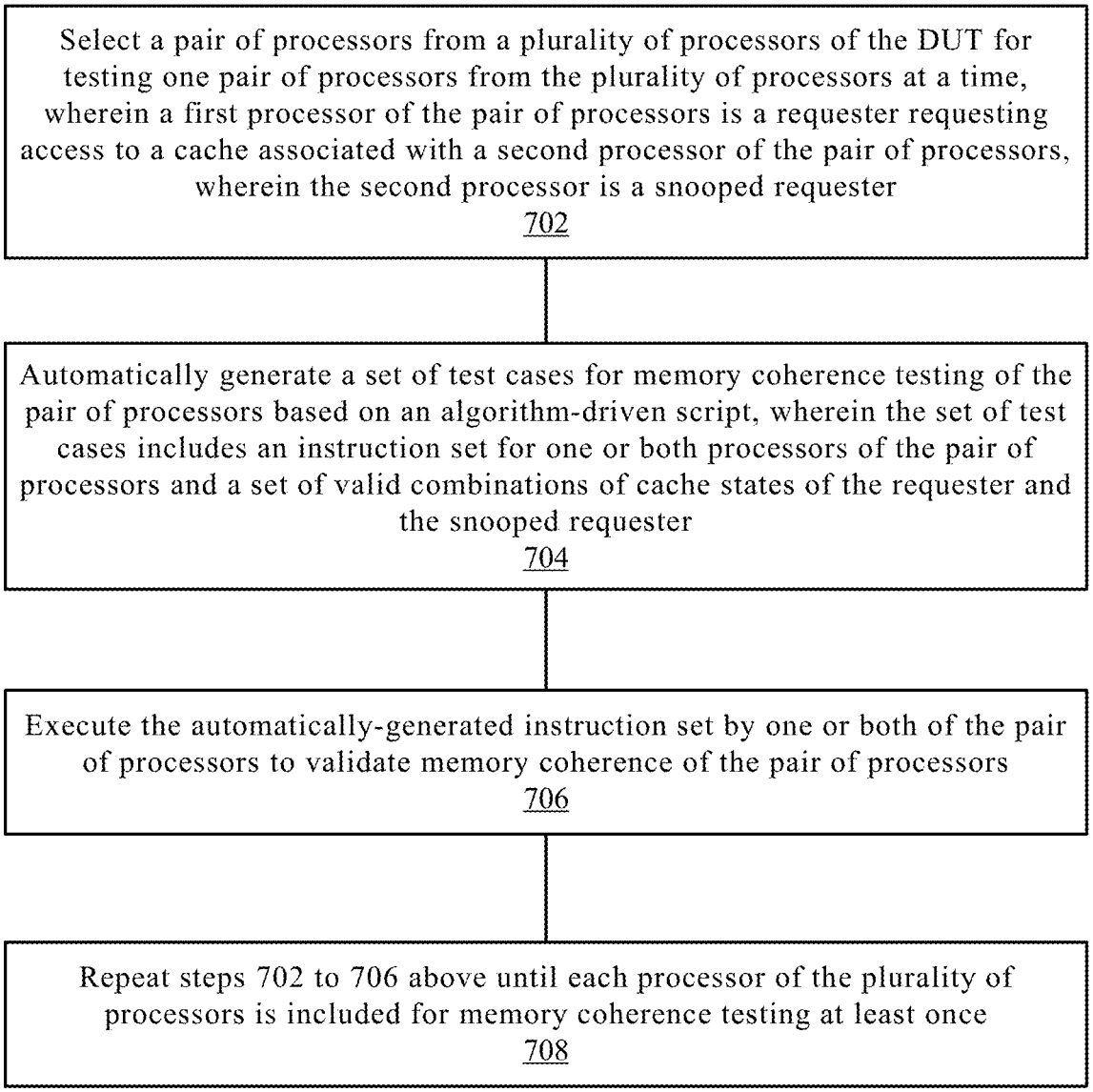
FIG. 7 depicts a flowchart of an example of a process to support systematic generation of test cases used to validate a multiprocessor system that supports memory coherence according to an aspect of a present embodiment.

FIG. 7 depicts a flowchart 700 of an example of a process to support systematic generation of test cases used to validate a multiprocessor system that supports memory coherence. Although the figure depicts functional steps in a particular order for purposes of illustration, the processes are not limited to any particular order or arrangement of steps. One skilled in the relevant art will appreciate that the various steps portrayed in this figure could be omitted, rearranged, combined and/or adapted in various ways.

In the example of FIG. 7, the flowchart 700 starts at block 702, where a pair of processors from a plurality of processors of a device under test (DUT) is selected for testing one pair of processors from the plurality of processors at a time, wherein a first processor of the pair of processors is a requester requesting access to a cache associated with a second processor of the pair of processors, wherein the second processor is a snooped requester. The flowchart 700 continues to block 704, where a set of test cases is automatically generated for memory coherence testing of the pair of processors based on an algorithm-driven script, wherein the set of test cases includes an instruction set for one or both processors of the pair of processors and a set of valid combinations of cache states of caches associated with the requester and the snooped requester, respectively. The flowchart 700 continues to block 706, where the automatically-generated instruction set is executed by one or both of the pair of processors to validate memory coherence of the pair of processors. The flowchart 700 ends at block 708, where steps 702 to 706 above are repeated until each processor of the plurality of processors is included for memory coherence testing at least once.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and the various modifications that are suited to the particular use contemplated.

What is claimed is:

1. A system to support test case generation for a device under test (DUT), comprising:
a testbench device configured to
a) select a pair of processors from a plurality of processors of the DUT for testing one pair of processors from the plurality of processors at a time, wherein a first processor of the pair of processors is a requester requesting access to a cache associated with a second processor of the pair of processors, wherein the second processor is a snooped requester;
b) automatically generate a set of test cases for memory coherence testing of the pair of processors based on an algorithm-driven script, wherein the set of test cases includes an instruction set for at least one of the first processor or the second processor and a set of valid combinations of cache states of caches associated with the requester and the snooped requester, respectively;
c) enable the instruction set to be executed by at least one of the first processor or the second processor to validate memory coherence of the pair of processors; and
d) repeat steps a) to c) above until each processor of the plurality of processors is included for memory coherence testing at least once.

2. The system of claim 1, wherein:
the DUT includes a main memory and a fabric connecting and supporting communication among the plurality of processors and the main memory.

3. The system of claim 2, wherein:
the DUT has multiple levels of caches for storing data retrieved from the main memory, wherein each of the plurality of processors has its own associated cache for maintaining data retrieved from the main memory and the fabric has its own cache for maintaining data being transferred among the processors and/or the main memory.

4. The system of claim 1, wherein:
the testbench device is configured to select another pair of processors having at least processor with the current pair of processors until every of the plurality of processors has been covered at least once for memory coherence testing.

5. The system of claim 1, wherein:
the testbench device is configured to assemble a list of instructions of the instruction set pertaining to and to be executed by one of the pair of processors; and
create a list of permissible initial cache states for both the requester and the snooped requester, respectively, for each instruction of the list of instructions using corresponding lists of cache state transitions of the requester and the snooped requester, respectively.

6. The system of claim 5, wherein:
the testbench device is configured to derive a set of valid cache state pairs of the requester and the snooped requester, respectively, for a given instruction based on the list of permissible initial cache states for both the requester and the snooped requester.

7. The system of claim 6, wherein:
the testbench device is configured to
derive possible cache state pairs from the permissible initial cache states of the requester and the snooped requester for the given instruction;
determine combinations of cache states that are valid among the possible cache state pair combinations given a specific protocol; and
apply the valid combinations as constraints to retain only the valid cache state pairs given the possible cache states.

8. The system of claim 6, wherein:
the testbench device is configured to categorize the cache state transitions into
1-node cache state transitions, where the list of instructions cause one processor to transition from an invalid cache state to one of other cache states if both of the processors in the pair starting from an invalid cache state; or
2-node cache state transitions, where combination of two or more instructions from both processors is needed to have them transition to a desired cache state pair if both processors starting from an invalid cache state.

9. The system of claim 6, wherein:
the testbench device is configured to generate one of the test cases by randomizing one or more of the list of instructions, the initial cache state of the requester and the initial cache state of the snooped requester.

10. The system of claim 6, wherein:
the testbench device is configured to generate at least one test case of the test cases directly by targeting and preselecting a valid parameter of one of the list of instruction, the initial cache state of the requester and the valid initial cache state of the snooped requester.

11. The system of claim 6, wherein:
the testbench device is configured to generate the set of test cases that includes possible combinations of instructions and cache states for memory coherence testing of the pair of processors.

12. A method to support test case generation for a device under test (DUT), comprising:
a) selecting a pair of processors from a plurality of processors of the DUT for testing one pair of processors from the plurality of processors at a time, wherein a first processor of the pair of processors is a requester requesting access to a cache associated with a second processor of the pair of processors, wherein the second processor is a snooped requester;
b) automatically generating a set of test cases for memory coherence testing of the pair of processors based on an algorithm-driven script, wherein the set of test cases includes an instruction set for at least one of the first processor or the second processor and a set of valid combinations of cache states of caches associated with the requester and the snooped requester, respectively;
c) executing the instruction set by at least one of the first processor or the second processor to validate memory coherence of the pair of processors;
d) repeating steps a) to c) above until each processor of the plurality of processors is included for memory coherence testing at least once.

13. The method of claim 12, further comprising:
selecting another pair of processors having at least processor with the current pair of processors until every of the plurality of processors has been covered at least once for memory coherence testing.

14. The method of claim 12, further comprising:
assembling a list of instructions of the instruction set pertaining to and to be executed by one of the pair of processors;

creating a list of permissible initial cache states for both the requester and the snooped requester, respectively, for each instruction of the list of instructions using corresponding lists of cache state transitions of the requester and the snooped requester, respectively.

15. The method of claim 14, further comprising:
deriving a set of valid cache state pairs of the requester and the snooped requester, respectively, for a given instruction based on the list of permissible initial cache states for both the requester and the snooped requester.

16. The method of claim 15, further comprising:
deriving possible cache state pairs from the permissible initial cache states of the requester and the snooped requester for the given instruction;
determining combinations of cache states that are valid among the possible cache state pair combinations given a specific protocol; and
applying the valid combinations as constraints to retain only the valid cache state pairs given the possible cache states.

17. The method of claim 15, further comprising:
categorizing the cache state transitions into
 1-node cache state transitions, where the list of instructions cause one processor to transition from an invalid cache state to one of other cache states if both of the processors in the pair starting from an invalid cache state; or
 2-node cache state transitions, where combination of two or more instructions from both processors is needed to have them transition to a desired cache state pair if both processors starting from an invalid cache state.

18. The method of claim 15, further comprising:
generating one of the test cases by randomizing one or more of the list of instructions, the initial cache state of the requester and the initial cache state of the snooped requester.

19. The method of claim 15, further comprising:
generating at least one test case of the test cases directly by targeting and preselecting a valid parameter of one of the list of instruction, the initial cache state of the requester and the valid initial cache state of the snooped requester.

20. The method of claim 15, further comprising:
generating the set of test cases that includes possible combinations of instructions and cache states for memory coherence testing of the pair of processors.

21. A system to support test case generation for a device under test (DUT), comprising:
 a means for a) selecting a pair of processors from a plurality of processors of the DUT for testing one pair of processors from the plurality of processors at a time, wherein a first processor of the pair of processors is a requester requesting access to a cache associated with a second processor of the pair of processors, wherein the second processor is a snooped requester;
 a means for b) automatically generating a set of test cases for memory coherence testing of the pair of processors based on an algorithm-driven script, wherein the set of test cases includes an instruction set for at least one of the first processor or the second processor and a set of valid combinations of cache states of caches associated with the requester and the snooped requester, respectively;
 a means for c) executing the instruction set by at least one of the first processor or the second processor to validate memory coherence of the pair of processors;
 a means for repeating steps a) to c) above until each processor of the plurality of processors is included for memory coherence testing at least once.

\* \* \* \* \*